United States Patent
Kim et al.

(10) Patent No.: US 12,092,937 B2
(45) Date of Patent: Sep. 17, 2024

(54) OPTICAL PATH CONTROL MEMBER AND DISPLAY DEVICE COMPRISING SAME

(71) Applicant: LG INNOTEK CO., LTD., Seoul (KR)

(72) Inventors: Hyun Joon Kim, Seoul (KR); Jun Sik Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 839 days.

(21) Appl. No.: 17/264,084

(22) PCT Filed: Sep. 3, 2019

(86) PCT No.: PCT/KR2019/011314
§ 371 (c)(1),
(2) Date: Jan. 28, 2021

(87) PCT Pub. No.: WO2020/050582
PCT Pub. Date: Mar. 12, 2020

(65) Prior Publication Data
US 2021/0373403 A1  Dec. 2, 2021

(30) Foreign Application Priority Data

Sep. 6, 2018 (KR) .......... 10-2018-0106242

(51) Int. Cl.
*G02F 1/166* (2019.01)
*G02F 1/1676* (2019.01)

(52) U.S. Cl.
CPC ............ *G02F 1/166* (2019.01); *G02F 1/1676* (2019.01)

(58) Field of Classification Search
CPC .... G02F 1/13394; G02F 1/167; G02F 1/1335; G02F 1/1337; G02F 1/13452;
(Continued)

(56) References Cited

U.S. PATENT DOCUMENTS 7,609,339 B2 * 10/2009 Choi ................. G02F 1/133514
349/104
8,199,282 B2   6/2012 Sugita et al.
(Continued)

FOREIGN PATENT DOCUMENTS

CN   101097343 A   1/2008
CN   103827726 A   5/2014
(Continued)

OTHER PUBLICATIONS

Office Action dated Jul. 5, 2023 in Taiwanese Application No. 108131343.
(Continued)

*Primary Examiner* — Brandi N Thomas
(74) *Attorney, Agent, or Firm* — Saliwanchik, Lloyd & Eisenschenk

(57) ABSTRACT

An optical path control member according to an embodiment comprises: a lower substrate; a lower electrode disposed on the lower substrate; an upper substrate disposed on the lower substrate; an upper electrode disposed under the upper substrate; and a pattern part interposed between the lower electrode and the upper electrode, wherein: the pattern part includes a first pattern part and a second pattern part alternately disposed; the first pattern part has an optical transmittance varying according to an applied voltage; the second pattern part transmits light; and the width of the first pattern part varies as the first pattern part extends from a light emitting part to a light transmitting part.

8 Claims, 12 Drawing Sheets

(58) Field of Classification Search
CPC ......... G02F 1/133512; G02F 1/133555; G02F 1/133514; G02F 1/133516; G02F 1/1339; G02F 1/134363; G02F 1/1345; G02F 1/1362; G02F 1/13; G02F 1/1334; G02F 1/133711; G02F 1/13439; G02F 1/136; G02F 1/1365; G02F 1/16757; G02F 1/1685; G02F 1/133; G02F 1/133345; G02F 1/133388; G02F 1/133519; G02F 1/13392; G02F 1/135; G02F 1/136209; G02F 1/136213; G02F 1/136286; G02F 1/1368; G02F 1/1393; G02F 2203/30; G02F 1/133305; G02F 1/133354; G02F 1/133371; G02F 1/133377; G02F 1/133502; G02F 1/133536; G02F 1/133553; G02F 1/133615; G02F 1/13362; G02F 1/133621; G02F 1/133622; G02F 1/133707; G02F 1/133734; G02F 1/133742; G02F 1/133784; G02F 1/133796; G02F 1/1341; G02F 1/13415; G02F 1/1343; G02F 1/134309; G02F 1/134336; G02F 1/134381; G02F 1/13454; G02F 1/13456; G02F 1/13458; G02F 1/13471; G02F 1/13613; G02F 1/136204; G02F 1/136227; G02F 1/136231; G02F 1/136277; G02F 1/13629; G02F 1/13712; G02F 1/13718; G02F 1/1396; G02F 1/141; G02F 1/16756; G02F 1/1676; G02F 1/1677; G02F 1/1679; G02F 1/1681; G02F 2201/121; G02F 2201/123; G02F 2202/04; G02F 2202/14; G02F 2202/42; G02F 2203/09; H01L 2224/16225; H01L 2224/32225; H01L 2224/73204; H01L 2224/48227; H01L 27/124; H01L 2924/00014; H01L 2924/15311; H01L 2924/3025; H01L 2224/12105; H01L 2224/48091; H01L 27/1214; H01L 27/1222; H01L 2924/01079; H01L 2924/12041; H01L 2924/19041; H01L 2029/7863; H01L 21/02675; H01L 2224/04026; H01L 2224/05568; H01L 2224/05573; H01L 2224/83101; H01L 27/00; H01L 27/12; H01L 27/1248; H01L 27/1255; H01L 27/1274; H01L 27/1288; H01L 27/14609; H01L 27/14623; H01L 27/14645; H01L 29/42384; H01L 29/458; H01L 29/4908; H01L 29/786; H01L 29/78621; H01L 29/78627; H01L 29/78633; H01L 29/78645; H01L 29/78669; H01L 29/78675; H01L 2924/13091
See application file for complete search history.

(56) References Cited

U.S. PATENT DOCUMENTS

| | | | |
|---|---|---|---|
| 9,229,253 B2* | 1/2016 | Schwartz | ................. B32B 3/30 |
| 9,529,381 B2 | 12/2016 | Huang et al. | |
| 9,851,746 B2 | 12/2017 | Huang et al. | |
| 2011/0261455 A1 | 10/2011 | Sugita et al. | |
| 2013/0264728 A1 | 10/2013 | Myoung et al. | |
| 2015/0062463 A1 | 3/2015 | Huang et al. | |
| 2015/0062464 A1 | 3/2015 | Huang et al. | |
| 2017/0123265 A1* | 5/2017 | Wang | ................. G02F 1/133377 |

FOREIGN PATENT DOCUMENTS

| | | |
|---|---|---|
| JP | 2003-280044 A | 10/2003 |
| KR | 10-2010-0058882 A | 6/2010 |
| KR | 10-2010-0060468 A | 6/2010 |
| KR | 10-2014-0085466 A | 7/2014 |
| KR | 10-2015-0061757 A | 6/2015 |
| KR | 10-2015-0097332 A | 8/2015 |
| KR | 10-2015-0125051 A | 11/2015 |
| KR | 10-2016-0069347 A | 6/2016 |
| KR | 10-2017-0012753 A | 2/2017 |
| KR | 10-2018-0004879 A | 1/2018 |
| KR | 10-2018-0125803 A | 11/2018 |
| TW | 200702800 A | 1/2007 |
| TW | 201508586 A | 3/2015 |

OTHER PUBLICATIONS

International Search Report dated Dec. 17, 2019 in International Application No. PCT/KR2019/011314.
Office Action dated Apr. 8, 2022 in Chinese Application No. 201980053536.0.
Supplementary European Search Report dated Apr. 8, 2022 in European Application No. 19856946.9.

* cited by examiner

VIEWING DIRECTION

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2019/011314, filed Sep. 3, 2019, which claims the benefit under 35 U.S.C. § 119 of Korean Application No. 10-2018-0106242, filed Sep. 6, 2018, the disclosures of each of which are incorporated herein by reference in their entirety.

TECHNICAL FIELD

Embodiments relate to an optical path control member and a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may control the movement path of light, block light in a specific direction, and transmit light in a specific direction.

Meanwhile, such a light-shielding film may be applied to a display device such as a navigation device or a vehicle dashboard in a movement means such as a vehicle. That is, the light-shielding film may be applied to various fields in accordance with various purposes.

In addition, the light-shielding film may be used in various environments of the user. For example, the light-shielding film may be used during the day or night, and may be applied in various environments, such as when the user requires a specific viewing angle or improved visibility.

However, since the light transmittance of a light blocking pattern of the light-shielding film is fixed, the user may be restricted in using the light-shielding film in various environments.

Therefore, there is a need for an optical path control member having a new structure that may be applied in various use environments.

DISCLOSURE

Technical Problem

An object of an embodiment is directed to providing an optical path control member that drives into another mode according to voltage application and a display device including the same.

Technical Solution

An optical path control member according to an embodiment includes: a lower substrate; a lower electrode disposed on the lower substrate; an upper substrate disposed on the lower substrate; an upper electrode disposed under the upper substrate; and a pattern part disposed between the lower electrode and the upper electrode, wherein the pattern part includes a first pattern part and a second pattern part alternately disposed, light transmittance of the first pattern part is changed according to voltage application, the second pattern part transmits light, and a width of the first pattern part changes while extending from a light emitting part toward a light transmitting part.

Advantageous Effects

An optical path control member according to an embodiment can include a pattern part in which light transmittance is changed according to voltage application.

That is, when a voltage is not applied, the pattern part of the optical path control member according to the embodiment can be driven as a light blocking part, and when the voltage is applied, the pattern part can be driven as a light transmitting part.

Accordingly, the optical path control member according to the embodiment can be applied in various ways according to a user's usage environment.

In addition, a width of the pattern part can be widened while the pattern part of the optical path control member according to the embodiment extends from a light incident part toward a light emitting part. Further, when the voltage is applied, since beads are moved in a direction in which the width is narrowed, the beads can be easily moved, thereby improving efficiency of the optical path control member.

Further, the pattern part can be disposed to be spaced apart from an electrode in a direction of a visual field surface or an electrode in a direction opposite to the direction of the visual field surface to reduce a decrease in light transmission by the pattern part and improve brightness. Accordingly, visibility of the optical path control member can be improved.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings.

Figure 1:
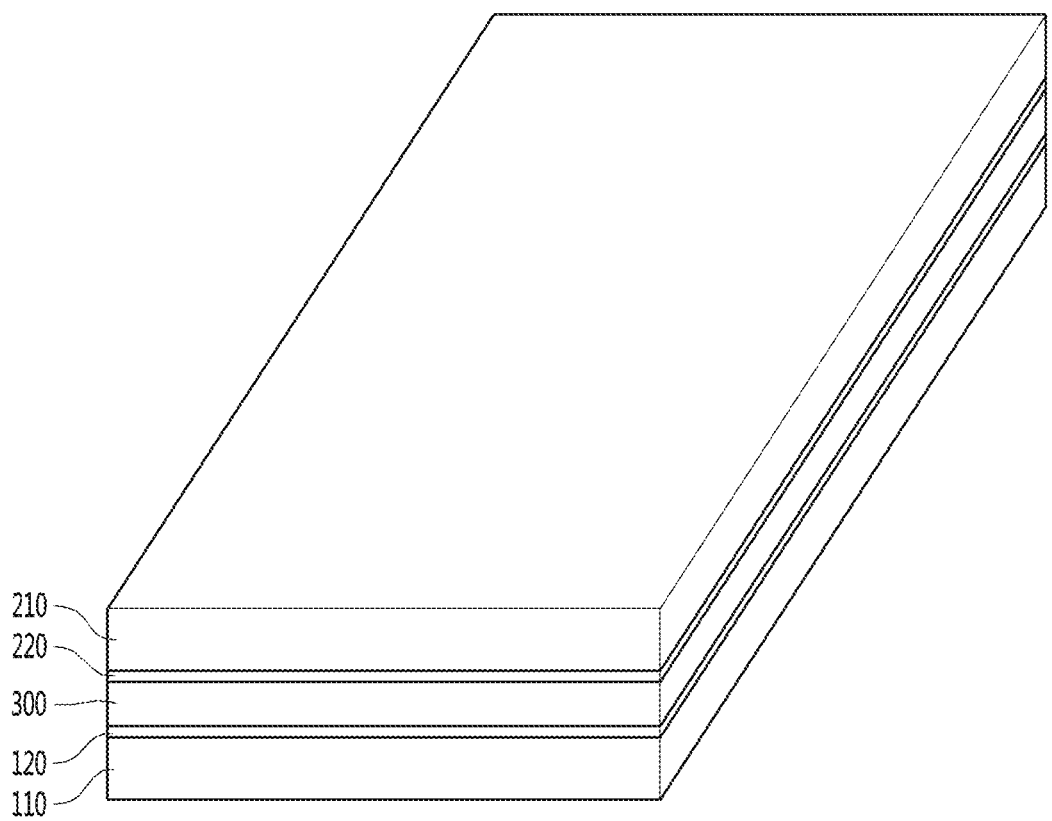
FIG. 1 is a view showing a perspective view of an optical path control member according to an embodiment.
Figure 2:
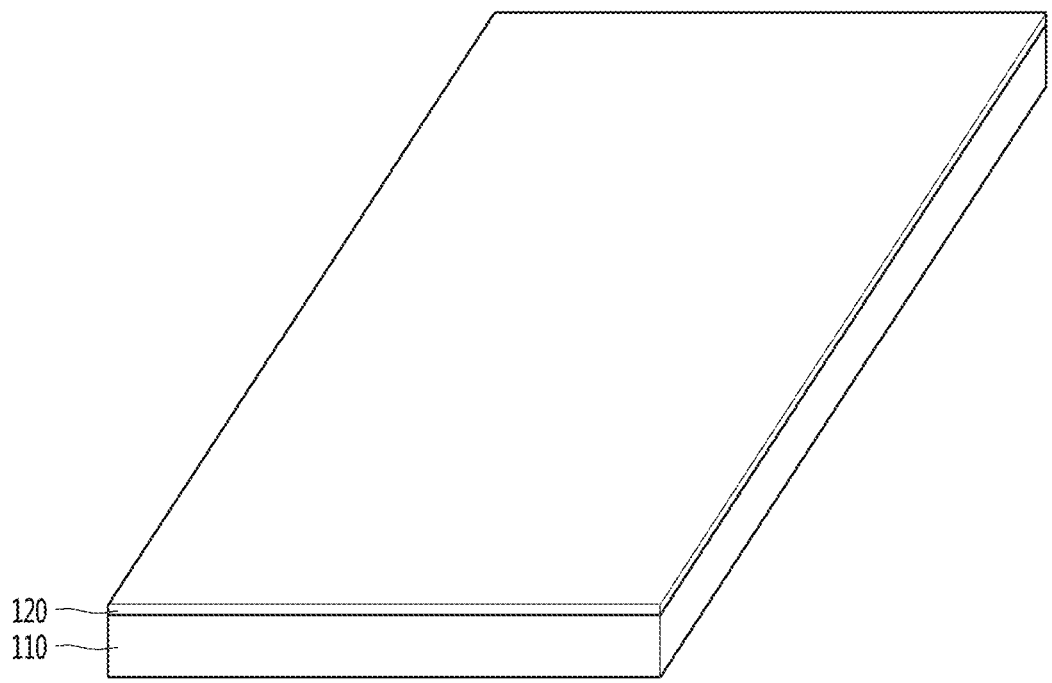
FIGS. 2 and 3 are views showing a perspective view of a lower substrate and a lower electrode, and an upper substrate and an upper electrode of the optical path control member according to the embodiment, respectively.
Figure 3:
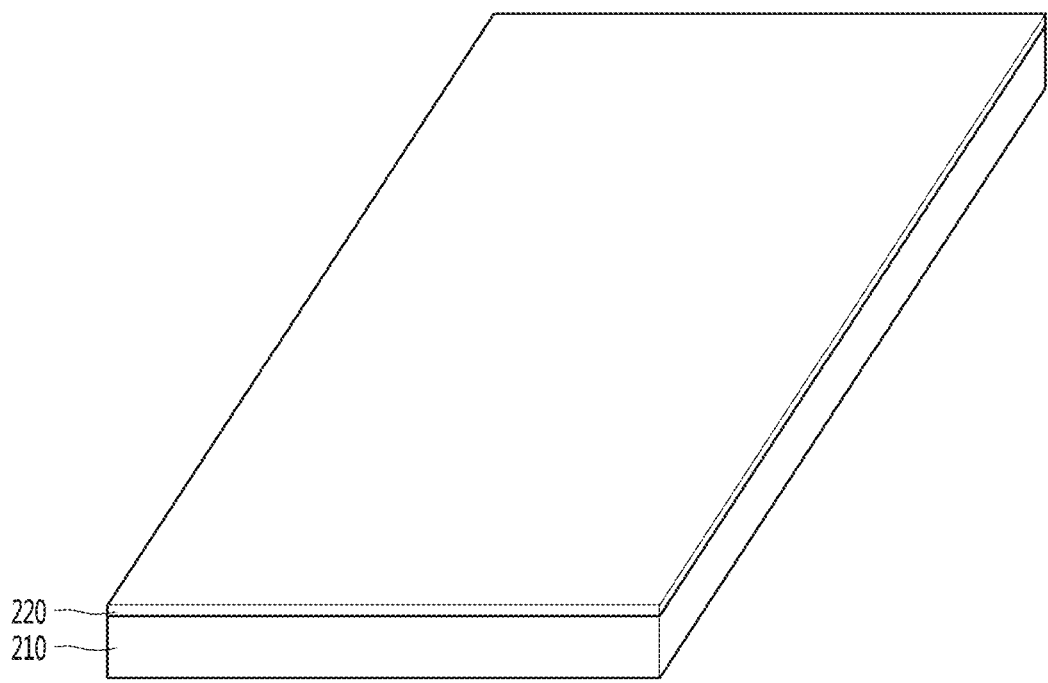

Referring to FIGS. 1 to 3, an optical path control member according to an embodiment may include a lower substrate 110, a lower electrode 120, an upper substrate 210, an upper electrode 220, and a pattern part 300.

The lower substrate 110 or the second substrate may support the lower electrode 120. The lower substrate 110 may be rigid or flexible.

The lower substrate 110 may be transparent. For example, the lower substrate 110 may include a transparent substrate capable of transmitting light.

The lower substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the lower substrate 110 may be a flexible substrate having flexible characteristics.

Further, the lower substrate 110 may be a curved or bended substrate. That is, the optical path control member including the lower substrate 110 may also be formed to have flexible, curved, or bent characteristics. Accordingly, the optical path control member according to the embodiment may be changed to various designs.

The lower substrate 110 may have a thickness of about 1 mm or less.

The lower electrode 120 (or a second electrode) may be disposed on one surface of the lower substrate 110.

The lower electrode 120 may contain a transparent conductive material. For example, the lower electrode 120 may contain a metal oxide such as indium tin oxide, indium zinc oxide, copper oxide, tin oxide, zinc oxide, titanium oxide, etc.

The lower electrode 120 may be disposed on the lower substrate 110 in a film shape. In addition, the light transmittance of the lower electrode 120 may be about 80% or more.

The lower electrode 120 may have a thickness of about 10 nm to about 50 nm.

Alternatively, the lower electrode 120 may contain various metals to realize low resistance. For example, the lower electrode 120 may contain at least one metal of chromium (Cr), nickel (Ni), copper (Cu), aluminum (Al), silver (Ag), molybdenum (Mo), gold (Au), titanium (Ti), and alloys thereof.

Alternatively, the lower electrode 120 may include a plurality of conductive patterns. For example, the lower electrode 120 may include a plurality of mesh lines intersecting each other and a plurality of mesh openings formed by the mesh lines.

Accordingly, even though the lower electrode 120 contains a metal, visibility may be improved because the lower electrode 120 is not visible from the outside. In addition, the light transmittance is increased by the openings, so that the brightness of the optical path control member according to the embodiment may be improved.

The upper substrate 210 (or a first substrate) may be disposed on the lower substrate 110. In detail, the upper substrate 210 may be disposed on the lower electrode 120 on the lower substrate 110.

The upper substrate 210 may contain a material capable of transmitting light. The upper substrate 210 may contain a transparent material. The upper substrate 210 may contain the same material as or similar to the lower substrate 110 described above.

For example, the upper substrate 210 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the upper substrate 210 may be a flexible substrate having flexible characteristics.

Further, the upper substrate 210 may be a curved or bended substrate. That is, the optical path control member including the upper substrate 210 may also be formed to have flexible, curved, or bent characteristics. Accordingly, the optical path control member according to the embodiment may be changed to various designs.

The upper substrate 210 may have a thickness of about 1 mm or less.

The upper electrode 220 (or a first electrode) may be disposed on one surface of the upper substrate 210. In detail, the upper electrode 220 may be disposed on a surface on which the upper substrate 210 faces the lower substrate 110. That is, the upper electrode 220 may be disposed facing the lower electrode 120 on the lower substrate 110.

The upper electrode 220 may contain a transparent conductive material. For example, the upper electrode 220 may contain a metal oxide such as indium tin oxide, indium zinc oxide, copper oxide, tin oxide, zinc oxide, titanium oxide, etc.

The upper electrode 220 may be disposed on the lower substrate 110 in a film shape. In addition, the light transmittance of the upper electrode 220 may be about 80% or more.

The upper electrode 220 may have a thickness of about 10 nm to about 50 nm.

Alternatively, the upper electrode 220 may contain various metals to realize low resistance. For example, the upper electrode 220 may contain at least one metal of chromium (Cr), nickel (Ni), copper (Cu), aluminum (Al), silver (Ag), molybdenum (Mo), gold (Au), titanium (Ti), and alloys thereof.

Alternatively, the upper electrode 220 may include a plurality of conductive patterns. For example, the upper electrode 220 may include a plurality of mesh lines intersecting each other and a plurality of mesh openings formed by the mesh lines.

Accordingly, even though the upper electrode 220 contains a metal, visibility may be improved because the upper electrode 220 is not visible from the outside. In addition, the light transmittance is increased by the openings, so that the brightness of the optical path control member according to the embodiment may be improved.

The pattern part 300 may be disposed between the lower substrate 110 and the upper substrate 210. In detail, the pattern part 300 may be disposed between the lower electrode 120 and the upper electrode 220.

For example, the pattern part 300 may be disposed on the lower electrode 120, and the pattern part 300 and the upper substrate 210 may be adhered through an adhesive layer. Alternatively, the pattern part 300 may be disposed on the upper electrode 220, and the pattern part 300 and the lower substrate 110 may be adhered through an adhesive layer.

Referring to FIGS. 4 to 9, the pattern part 300 may include a first pattern part 310 and a second pattern part 320.

The first pattern part 310 and the second pattern part 320 may be alternately disposed. The first pattern part 310 and the second pattern part 320 may be disposed in different widths. For example, the width of the second pattern part 320 may be greater than the width of the first pattern part 310.

The first pattern part 310 and the second pattern part 320 may be disposed in contact with at least one of the lower electrode 120 and the upper electrode 220.

For example, referring to FIGS. 4 to 9, one end of the first pattern part 310 may be connected to the lower electrode 120, and the other end of the first pattern part 310 may be connected the upper electrode 220.

In addition, one end of the second pattern part 320 may be connected to the lower electrode 120, and the other end of the second pattern part 320 may be connected to the upper electrode 220.

The first pattern part 310 and the second pattern part 320 may be alternately disposed. In detail, the first pattern part 310 and the second pattern part 320 may be alternately disposed. That is, each of the first pattern parts 310 may be disposed between the second pattern parts 320 adjacent to each other, and each of the second pattern parts 320 may be disposed between the first pattern parts 310 adjacent to each other.

The second pattern part 320 may contain a transparent material. The second pattern part 320 may contain a material that may transmit light.

The second pattern part 320 may contain a resin material. For example, the second pattern part 320 may contain a photo-curable resin material. As an example, the second pattern part 320 may contain a UV resin or a transparent photoresist resin. Alternatively, the second pattern part 320 may contain urethane resin or acrylic resin.

The second pattern part 320 may transmit light incident on any one of the lower substrate 110 and the upper substrate 210 toward another substrate.

For example, in FIGS. 4 to 9, light may be emitted from a direction of the upper substrate 210 to be incident on the upper substrate 210. The second pattern part 320 may transmit the light, and the light may be moved in a direction of the lower substrate 110.

The first pattern part 310 may include a matrix m and beads b. In detail, the first pattern part 310 may include the matrix m and a plurality of beads b dispersed into the matrix m.

The matrix m may be a material for dispersing the beads b. The matrix m may contain a transparent material. The matrix m may contain a paraffinic solvent.

The beads b may be disposed to be dispersed in the matrix m. In detail, the plurality of beads b may be disposed to be spaced apart from each other in the matrix m.

The beads b may include a color. For example, the beads b may include black beads. As an example, the beads b may include carbon black.

The beads b may be formed in a spherical shape. The beads b may have a diameter of several nanometers.

The first pattern part 310 may be changed in the light transmittance by the beads b. In detail, the light transmittance of the first pattern part 310 may be changed to a light blocking part and a light transmitting part by the beads b.

For example, the optical path control member according to the embodiment may be changed from a first mode to a second mode or from the second mode to the first mode.

In detail, in the optical path control member according to the embodiment, the first pattern part 310 becomes the light blocking part in the first mode, and in the optical path control member according to the embodiment, light of a specific angle may be blocked by the first pattern part 310.

In addition, in the optical path control member according to the embodiment, the first pattern part 310 becomes the light transmitting part in the second mode, and in the optical path control member according to the embodiment, light may be transmitted through the first pattern part 310 and the second pattern part 320.

Switching from the first mode to the second mode, that is, the conversion of the first pattern part 310 from the light blocking part to the light transmitting part may be realized by the movement of the beads b of the first pattern part 310.

In detail, the first pattern part 310 may be electrically connected to the lower electrode 120 and/or the upper electrode 220.

At this time, when an external voltage is not applied to the optical path control member, the beads are uniformly dispersed in the matrix, and light incident on the first pattern part 310 may be absorbed by the beads inside the first pattern part 310 to block the light. Accordingly, in the first mode, the first pattern part 310 may be driven as the light blocking part.

Meanwhile, when an external voltage is applied to the optical path control member, the beads b may be moved. For example, a voltage may be applied to the beads b to move the beads b in a direction of one end or the other end of the first pattern part 310. That is, the beads b may be moved to be close to any one of the lower electrode 120 and the upper electrode 220.

As a method of moving the beads, first, the beads including the carbon black may be charged. For example, micelles may be formed and a charging effect may be created by charging the carbon black beads themselves with a negative charge or chemically introducing a functional group similar to a surfactant to a surface of the carbon black beads to charge the beads.

Subsequently, when a voltage is applied to the lower electrode 120 and/or the upper electrode 220, an electric field is formed between the lower electrode 120 and the upper electrode 220, and the charged carbon black beads may be moved toward a positive electrode of the lower electrode 120 and the upper electrode 220 using the matrix as a medium.

Figure 4:
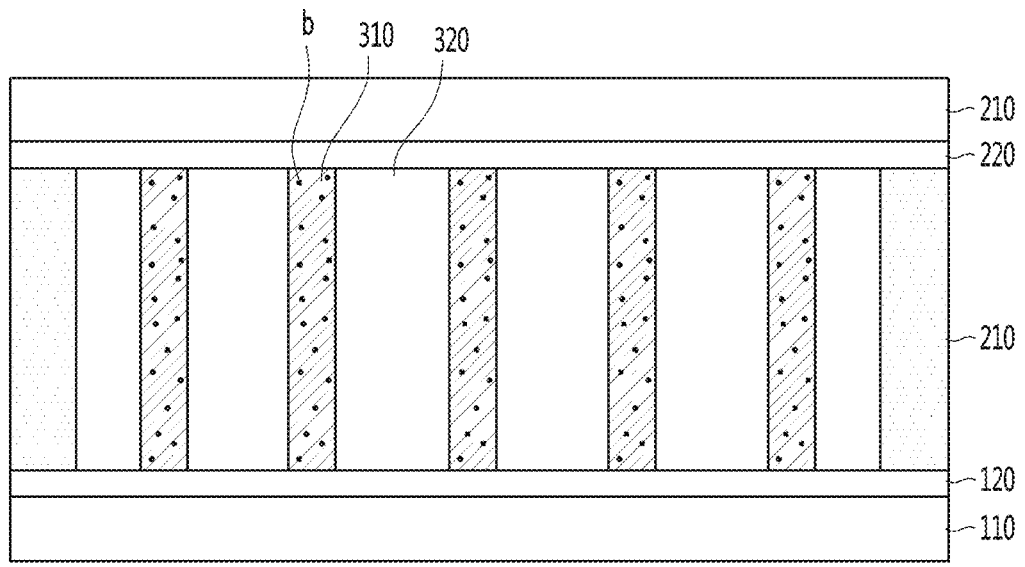
FIGS. 4 to 9 are views showing a cross-sectional view of the optical path control member according to the embodiment.
Figure 4:
Figure 6:
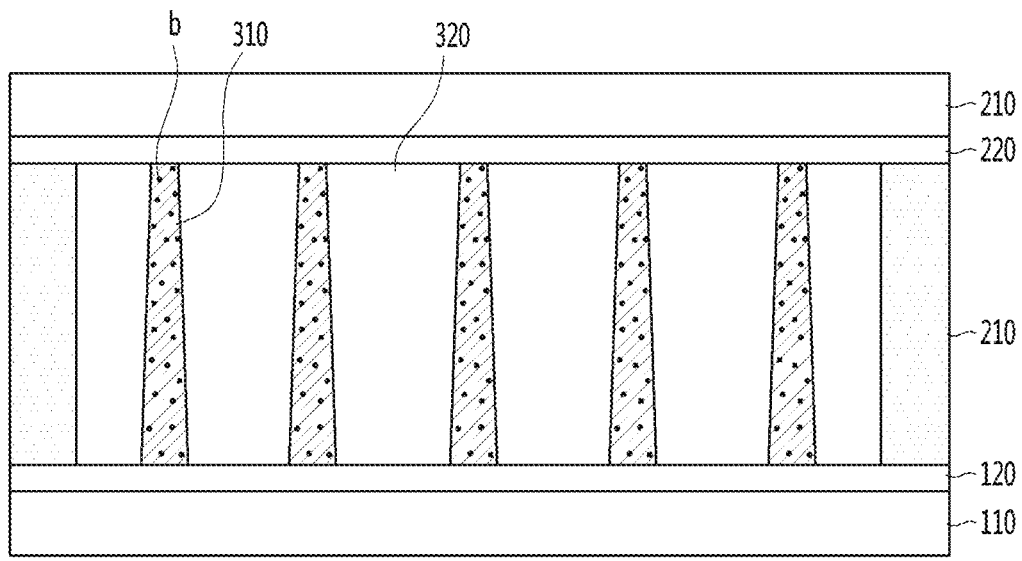
Figure 6:
Figure 8:
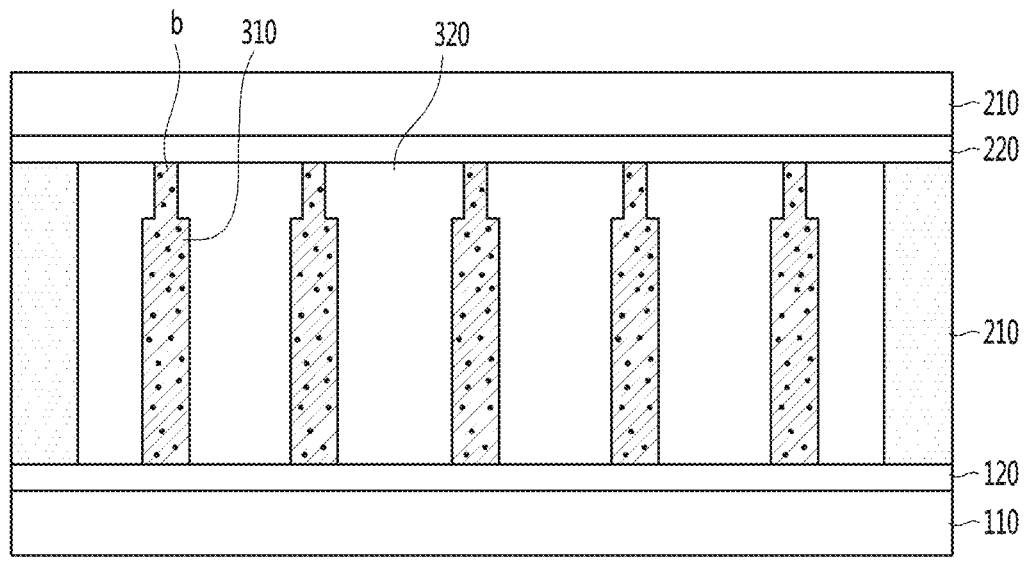
Figure 8:

That is, when the voltage is not applied to the lower electrode 120 and/or the upper electrode 220, as shown in FIGS. 4, 6, and 8, the beads b may be uniformly dispersed in the matrix to drive the first pattern part 310 as the light blocking part.

Figure 5:
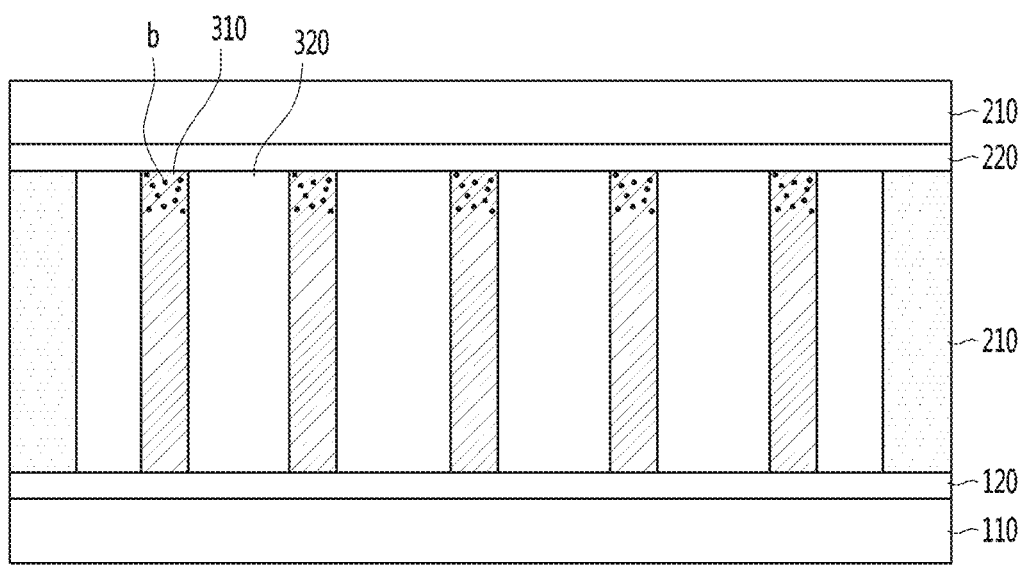
Figure 5:
Figure 7:
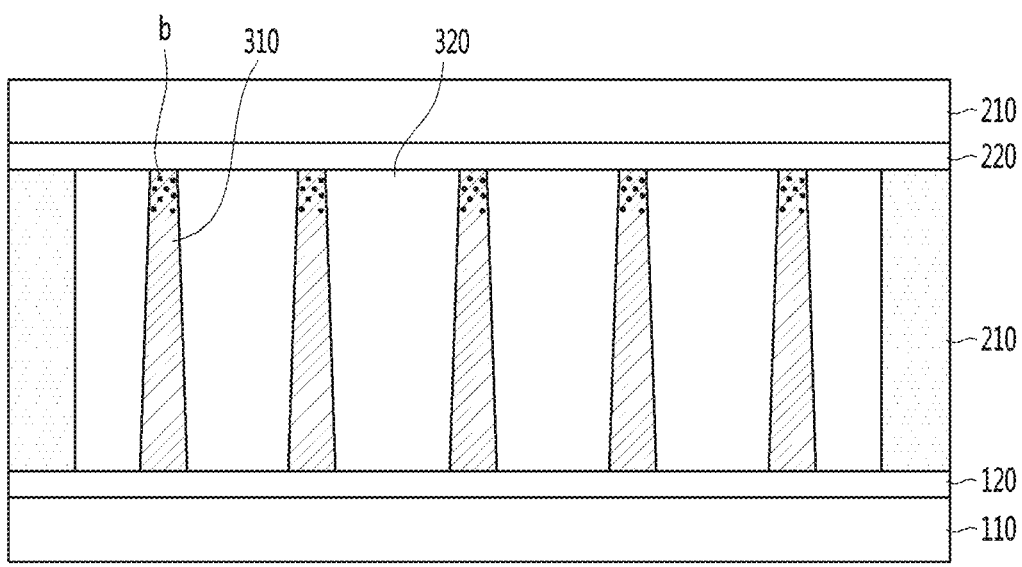
Figure 7:
Figure 9:
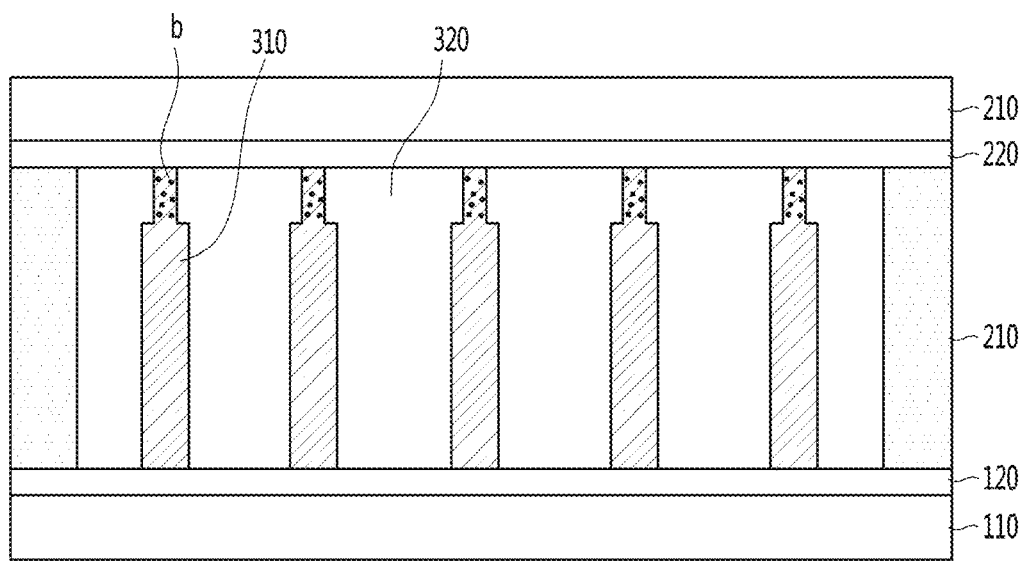
Figure 9:
Figure 10:
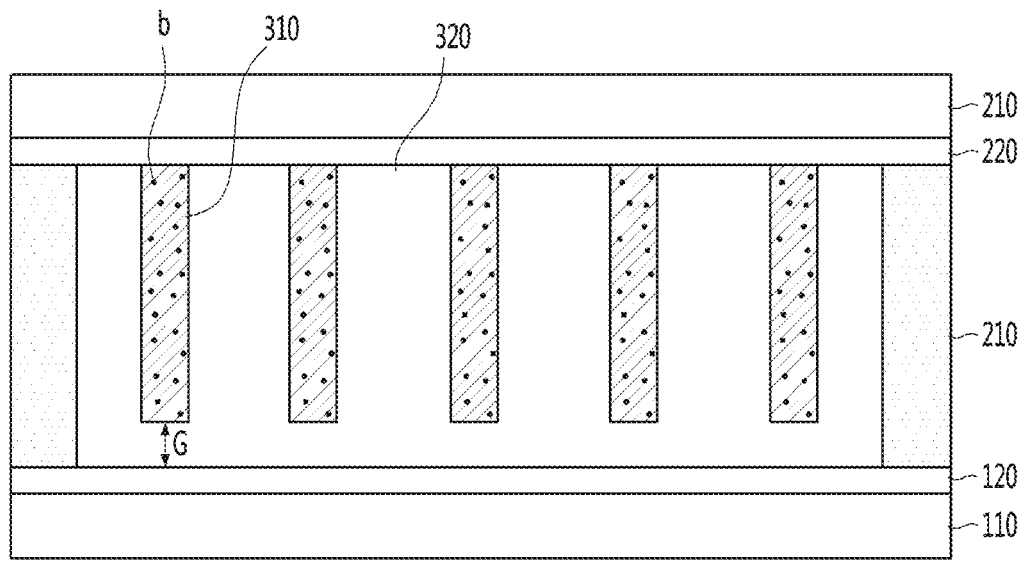
FIGS. 10 to 15 are views showing another cross-sectional view of the optical path control member according to the embodiment.
Figure 10:
Figure 11:
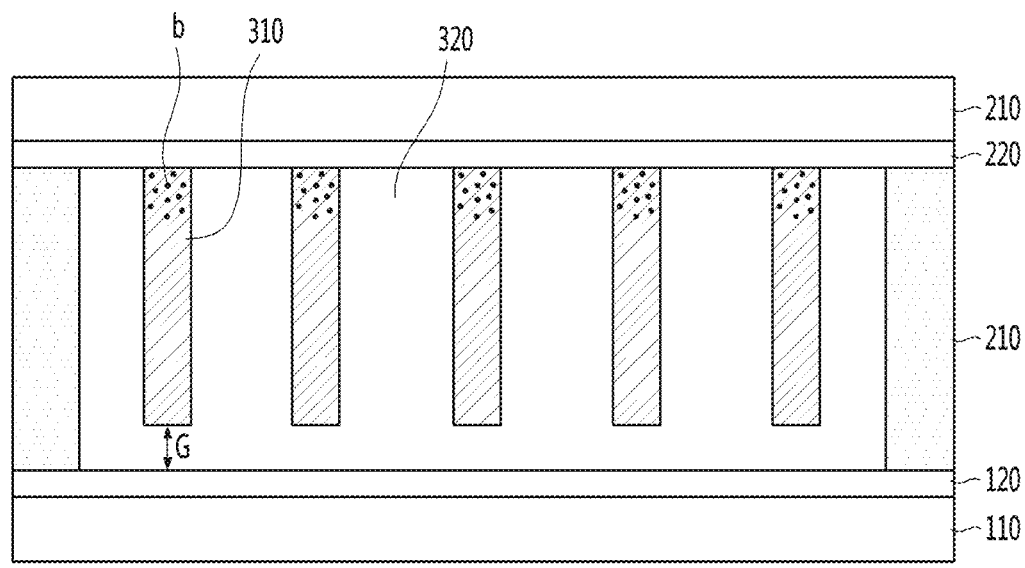
Figure 11:
Figure 12:
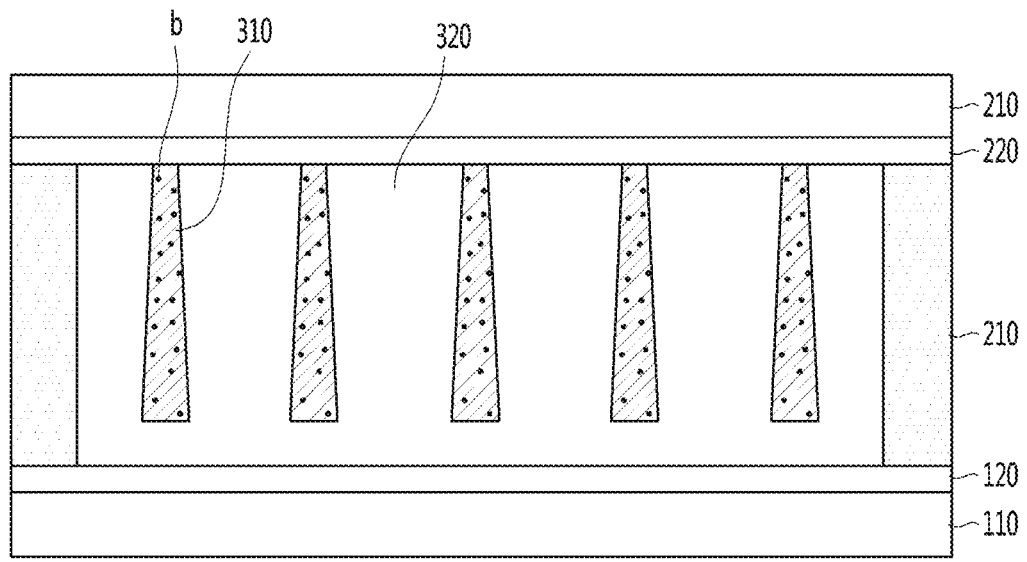
Figure 12:
Figure 13:
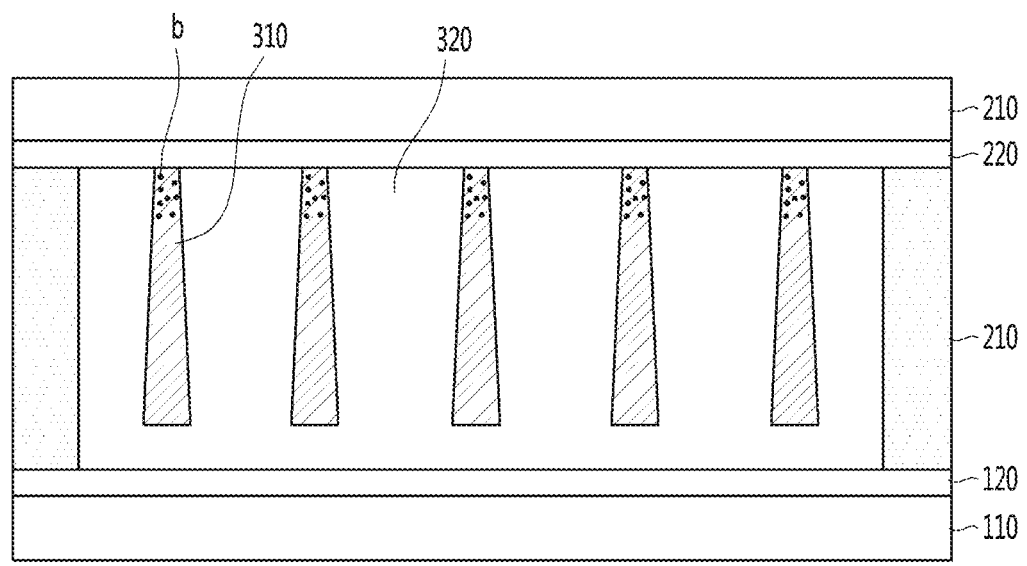
Figure 13:
Figure 14:
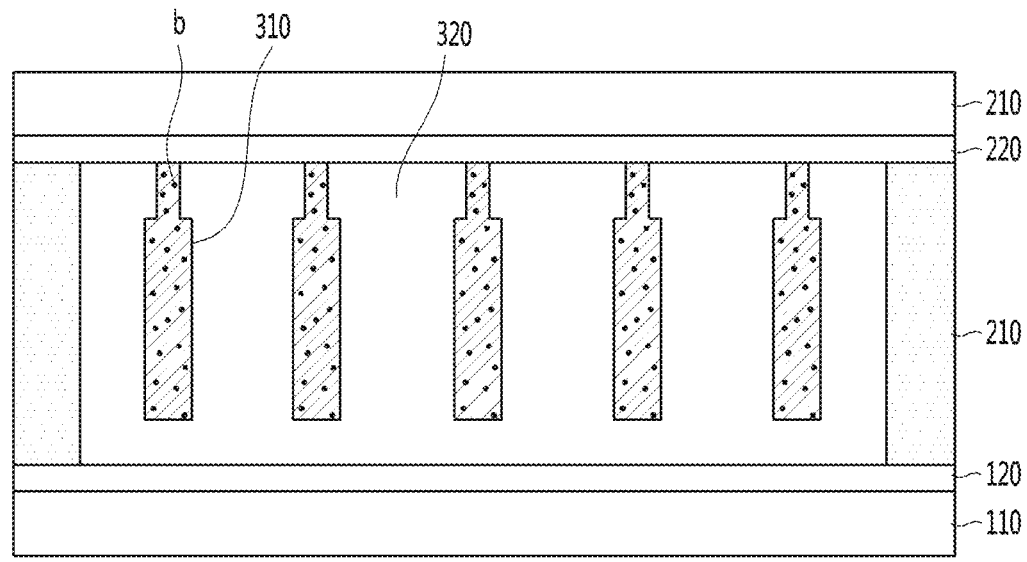
Figure 14:
Figure 15:
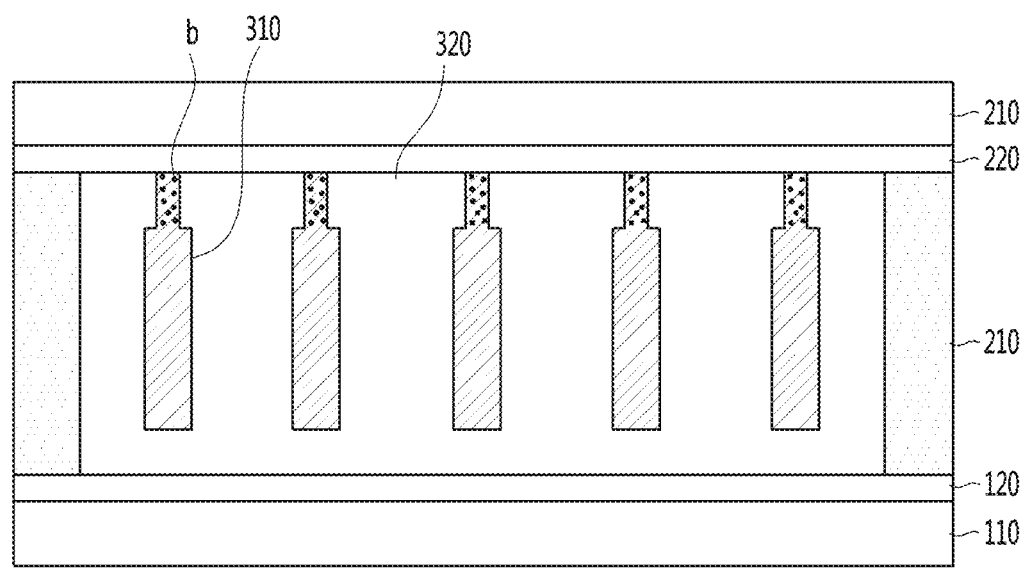
Figure 15:
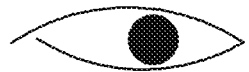

In addition, when the voltage is applied to the lower electrode 120 and/or the upper electrode 220, as shown in FIGS. 5, 7, and 9, the beads b may be moved toward the upper electrode 220 in the matrix (when the lower electrode has a positive charge, the beads b are moved toward the lower electrode). That is, the beads b are moved in one direction, and accordingly, the first pattern part 310 may be driven as the light transmitting part.

Accordingly, the optical path control member according to the embodiment may be driven in two modes according to a user's surrounding environment. That is, when the user requires light transmission only at a specific viewing angle, the first pattern part is driven as the light blocking part, or in an environment in which the user requires high brightness, a voltage may be applied to drive the first pattern part as the light transmitting part.

Therefore, since the optical path control member according to the embodiment may be implemented in two modes according to the user's requirement, the optical path control member may be applied regardless of the user's environment.

Meanwhile, the first pattern part 310 may be formed in various shapes.

Referring to FIGS. 4 and 5, the first pattern part 310 may be formed in a bar shape. That is, a width of the first pattern part 310 may be formed uniformly while the first pattern part 310 extends from one end of the first pattern part 310 to the other end thereof.

Accordingly, when light is blocked by the first pattern part 310, the first pattern part 310 may easily control a viewing angle.

Alternatively, referring to FIGS. 6 to 9, the width of the first pattern part 310 may be changed while the first pattern part 310 extends from one end of the first pattern part 310 to the other end thereof.

For example, referring to FIGS. 6 and 7, the first pattern part 310 may be formed in a trapezoidal shape. Alternatively, referring to FIGS. 8 and 9, the first pattern part 310 may include two pattern parts having different widths.

As an example, as shown in FIGS. 6 and 7, the first pattern part 310 may be formed so that the width of the first pattern part 310 is widened while extending from the lower electrode 120 toward the upper electrode 220.

Alternatively, as shown in FIGS. 8 and 9, the first pattern part 310 may include a first sub-first pattern part in contact with the lower electrode 120 and a second sub-first pattern part in contact with the upper electrode 220.

In this case, the first sub-first pattern part may have a larger width and a larger height than the second sub-first pattern part.

The width of the first pattern part 310 may be narrowed while extending from a surface in the visual field direction toward an opposite surface thereof. In addition, when a voltage is applied to the pattern part, the beads of the first pattern part 310 may be moved in a direction in which the width is narrowed.

That is, the width of the first pattern part 310 may be widened while extending from a light incident part in which light is incident toward a light emitting part in which light is emitted.

That is, the beads of the first pattern part 310 may be moved toward the upper electrode 220.

Accordingly, since the beads are moved toward the opposite surface of the visual field surface instead of the visual field surface, it is possible to inhibit blocking of light emitted toward the visual field surface, thereby improving the brightness of the optical path control member.

In addition, since the beads are moved from a wide region toward a narrow region, the beads may be easily moved.

FIGS. 10 to 15 are views showing another cross-sectional view of the pattern part of the optical path control member according to the embodiment.

Referring to FIGS. 10 to 15, the first pattern part 310 of the optical path control member according to the embodiment may be disposed to be spaced apart from the lower electrode 120 or the upper electrode 220. That is, the first pattern part 310 may be disposed in contact with only one of the lower electrode 120 and the upper electrode 220.

For example, referring to FIGS. 10 to 15, the first pattern part 310 and the lower electrode 120 may be spaced apart from each other, and a gap g may be formed therebetween.

A material that is the same as or similar to that of the second pattern part 320 may be disposed in a region in which the first pattern part 310 and the lower electrode 120 are spaced apart from each other.

The first pattern part 310 may be disposed to be spaced apart from the electrode in the direction of the visual field surface. That is, the electrode in the direction of the visual field surface may not be in contact with the first pattern part 310.

Accordingly, the brightness of the optical path control member may be improved by increasing transmittance of light emitted toward the visual field surface, thereby improving visibility thereof.

In addition, referring to FIGS. 12 to 16, an end region having a large width of the first pattern part 310 may be disposed to be spaced apart from the lower electrode or the upper electrode.

That is, when a voltage is applied, the first pattern part 310 may be disposed to be spaced apart from an end of a region opposite to a region in which the beads move, the lower electrode, or the upper electrode.

FIGS. 16 to 21 are views showing still another cross-sectional view of the pattern part of the optical path control member according to the embodiment.

Referring to FIGS. 16 to 21, the first pattern part 310 of the optical path control member according to the embodiment may be disposed to be spaced apart from the lower electrode 120 and the upper electrode 220. That is, the first pattern part 310 may be disposed to be spaced apart from both the lower electrode 120 and the upper electrode 220.

That is, the first pattern part 310 may be disposed to be spaced apart from both an electrode in the direction of the visual field surface and an electrode on an opposite surface of the visual field surface.

A material that is the same as or similar to that of the second pattern part 320 may be disposed in a region in which the first pattern part 310, the lower electrode 120, and the upper electrode 220 are spaced apart from one other.

Accordingly, the brightness of the optical path control member may be improved by increasing the transmittance of light incident toward the light incident surface and light emitted toward the visual field surface, thereby improving visibility thereof.

The optical path control member according to the embodiment may include the pattern part in which the light transmittance is changed according to voltage application.

That is, when a voltage is not applied, the pattern part of the optical path control member according to the embodiment may be driven as the light blocking part, and when the voltage is applied, the pattern part may be driven as the light transmitting part.

Accordingly, the optical path control member according to the embodiment may be applied in various ways according to a user's usage environment.

In addition, the width of the pattern part may be widened while the pattern part of the optical path control member according to the embodiment extends from the light incident part toward the light emitting part. Further, when the voltage is applied, since beads are moved in the direction in which the width is narrowed, the beads may be easily moved, thereby improving efficiency of the optical path control member.

Further, the pattern part may be disposed to be spaced apart from the electrode in the direction of the visual field surface or the electrode in the direction opposite to the direction of the visual field surface to reduce a decrease in light transmission by the pattern part and improve brightness. Accordingly, visibility of the optical path control member may be improved.

Figure 22:
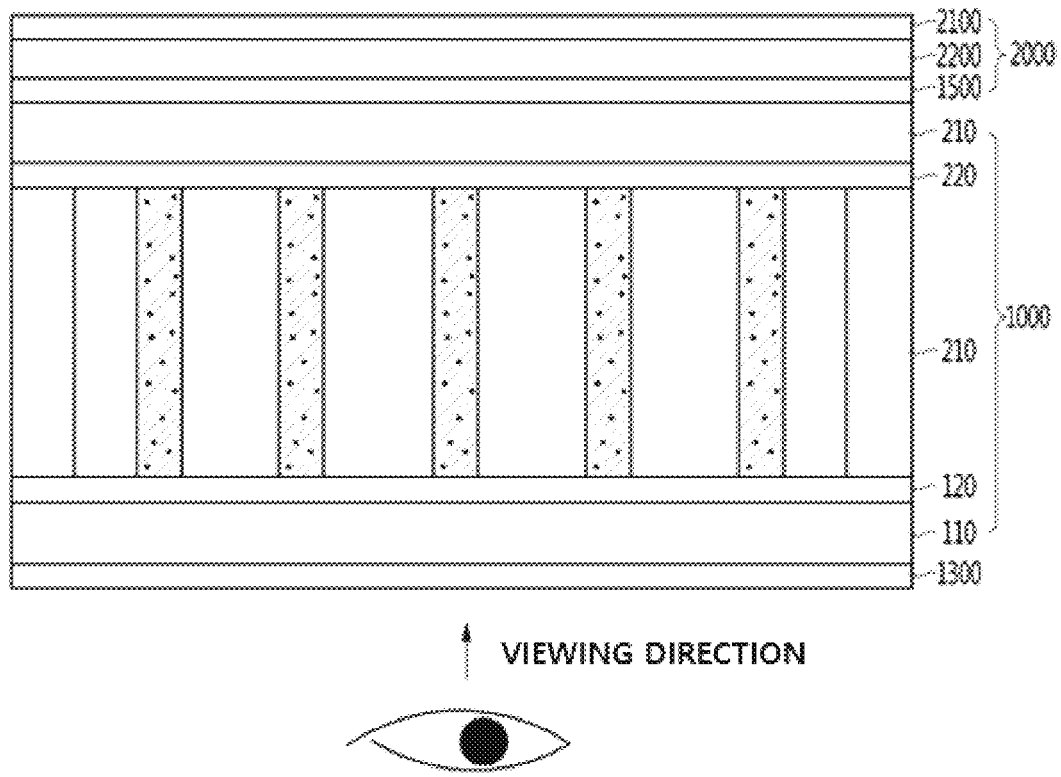
FIG. 22 is a view showing a cross-sectional view of a display device to which an optical path control member according to embodiments is applied.

Hereinafter, referring to FIGS. 22 and 23, a display device and a display apparatus to which an optical path control member according to an embodiment is applied will be described.

Figure 16:
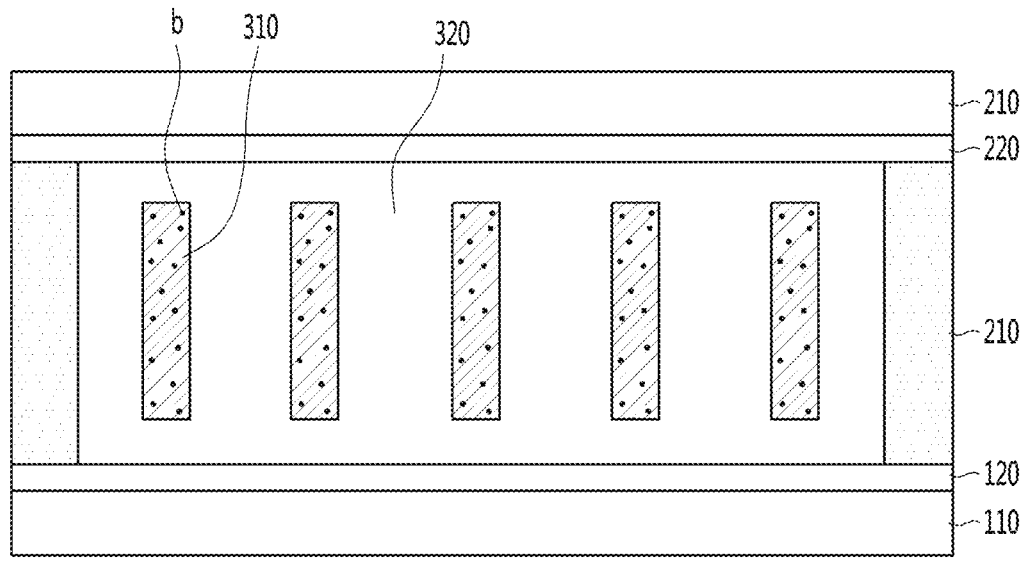
FIGS. 16 to 21 are views showing still another cross-sectional view of the optical path control member according to the embodiment.
Figure 16:
Figure 17:
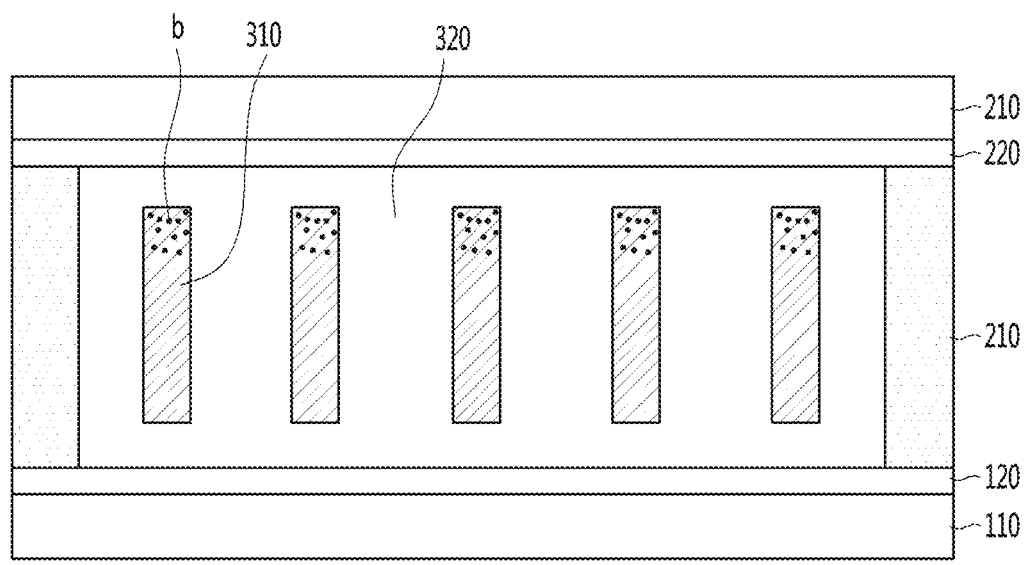
Figure 17:
Figure 18:
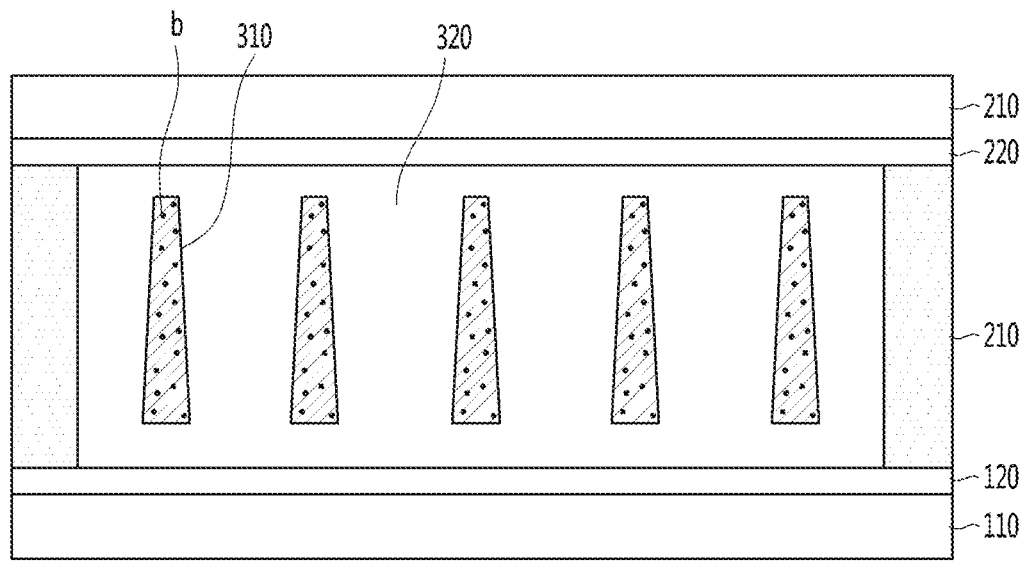
Figure 19:
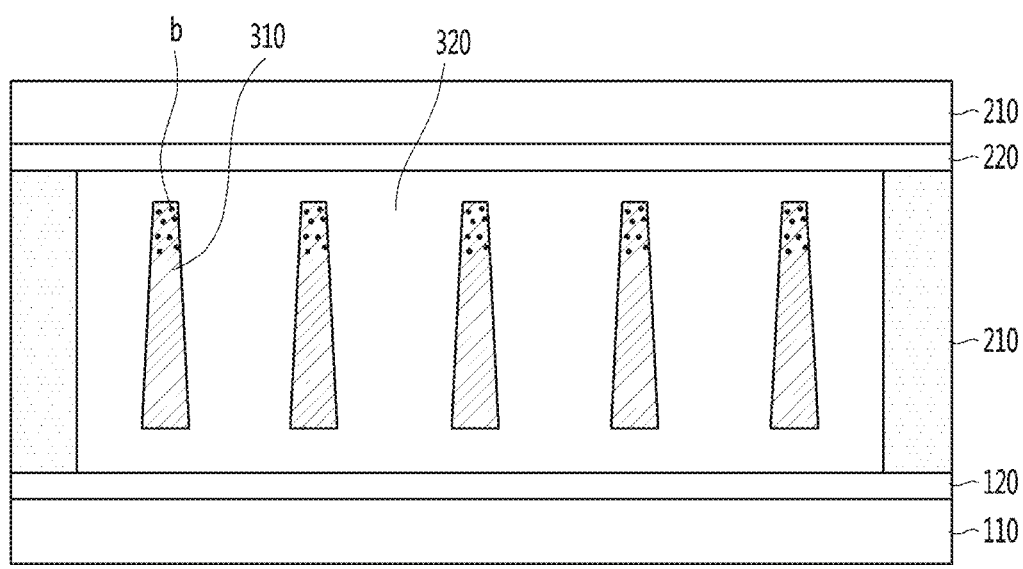
Figure 20:
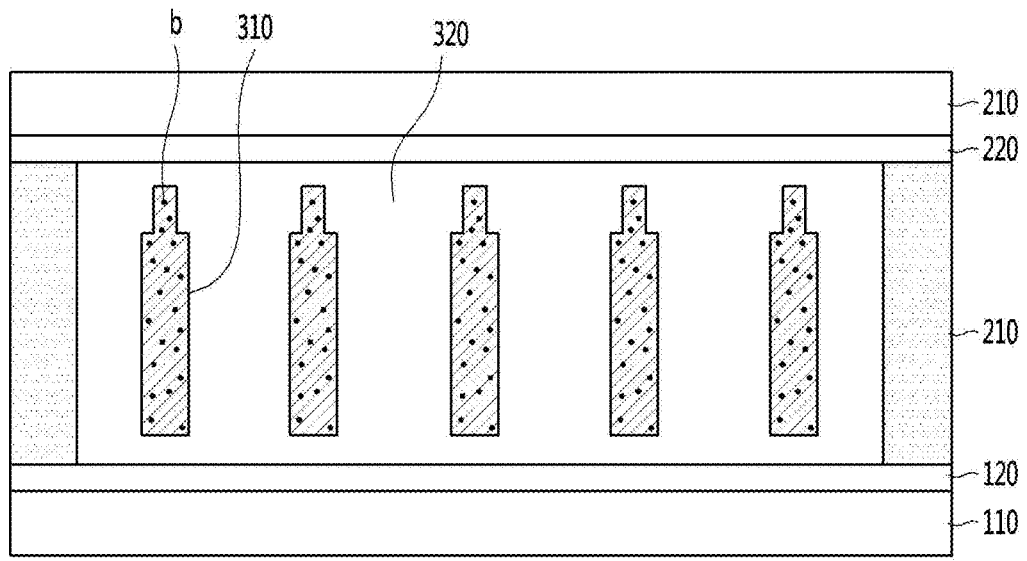
Figure 20:
Figure 21:
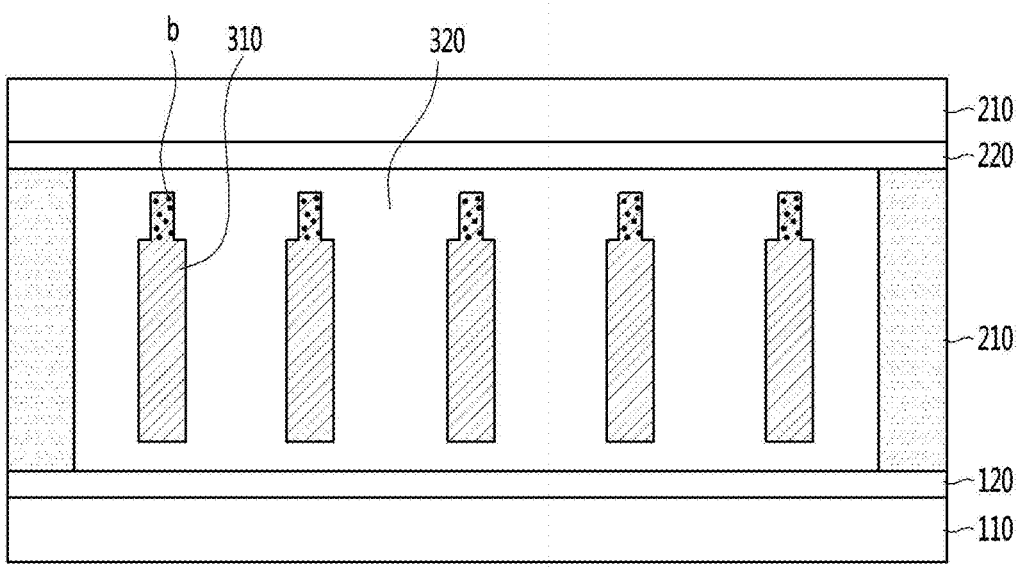
Figure 21:

Referring to FIG. 16, an optical path control member 1000 according to an embodiment may be disposed on a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. Specifically, the adhesive layer may be disposed while covering the pattern part on the optical path control member, and when the adhesive layer adheres to the pattern layer or the display panel, after the release film is removed, the pattern layer, the optical path control member, and the display panel may be adhered to each other.

Accordingly, when the pattern part is exposed to the outside by the adhesive layer 1500, a risk of breakage may be inhibited. That is, the adhesive layer 1500 may be an adhesive layer and a protective layer.

The display panel 2000 may include a first substrate 2100 and a second substrate 2200. When the display panel 2000 is a liquid crystal display panel, the display panel 2000 may be formed in a structure in which a first substrate 2100 including a thin film transistor (TFT) and a pixel electrode and a second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at a first substrate 2100 and a second substrate 2200 is bonded to the first substrate 2100 with a liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, a black matrix may be omitted, and a common electrode may be formed to function as the black matrix.

In addition, when the display panel 2000 is a liquid crystal display panel, the display device may further include a backlight unit providing light from a rear surface of the display panel 2000.

Alternatively, when the display panel 2000 is an organic electroluminescence display panel, the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, a second substrate 2200 configured to function as an encapsulation substrate for encapsulation may further be included on the organic light emitting element.

Furthermore, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is an organic electroluminescence display panel, the polarizing plate may be the external light reflection preventive polarizing plate.

In addition, an additional functional layer 1300 such as an anti-reflection layer, an anti-glare, or the like may be further disposed on the optical path control member 1000. Specifically, the functional layer 1300 may be adhered to one surface of the base substrate 100 of the optical path control member. Although not shown in drawings, the functional layer 1300 may be adhered to the base 100 of the optical path control member via an adhesive layer. In addition, a release film for protecting the functional layer may be further disposed on the functional layer 1300.

Further, a touch panel may be further disposed between the display panel and the optical path control member.

Although it is shown in the drawings that the optical path control member is disposed at an upper portion of the display panel, but the embodiment is not limited thereto, and the optical path control member may be disposed at various positions such as a position in which light is adjustable, that is, a lower portion of the display panel, between an upper substrate and a lower substrate of the display panel, or the like.

Figure 23:
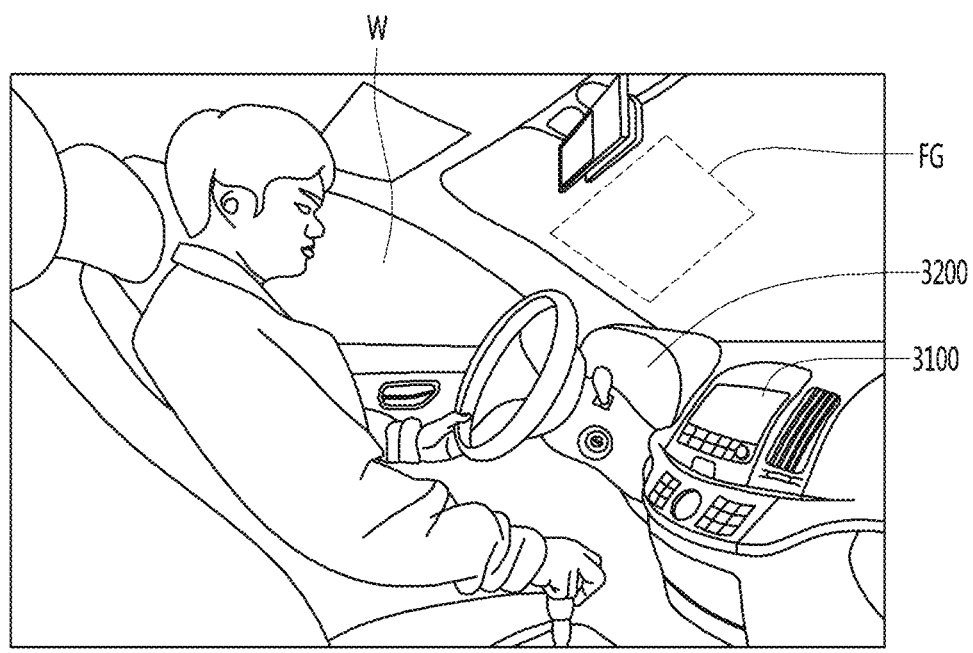
FIG. 23 is a view for explaining one embodiment of a display device to which an optical path control member according to an embodiment is applied.

Referring to FIG. 23, an optical path control member according to an embodiment may be applied to a vehicle.

Referring to FIG. 23, a display device to which the optical path control member according to the embodiment is applied may be disposed inside a vehicle.

For example, the display device according to the embodiment may display a video confirming information of the vehicle and a movement route of the vehicle. The display apparatus 3100 may be disposed between a driver seat and a passenger seat of the vehicle.

In addition, the optical path control member according to the embodiment may be applied to a dashboard 3200 that displays a speed, an engine, an alarm signal, and the like of the vehicle.

Furthermore, the optical path control member according to the embodiment may be applied to a windshield FG of the vehicle or right and left window glasses W.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, the above description of the embodiments is merely examples and does not limit the present invention. It would be apparent to those of ordinary skill in the art that the present invention may be easily embodied in many different forms without changing the technical idea or essential features thereof. For example, elements of the exemplary embodiments described herein may be modified and realized. Also, it should be construed that differences related to such changes and applications are included in the scope of the present invention defined in the appended claims.

The invention claimed is:

1. An optical path control member comprising:
a lower substrate;
a lower electrode disposed on the lower substrate;
an upper substrate disposed on the lower substrate;
an upper electrode disposed under the upper substrate; and
a pattern part disposed between the lower electrode and the upper electrode and through which light is transmitted,
wherein the pattern part includes a first pattern part and a second pattern part alternately disposed,
wherein light transmittance of the first pattern part is changed according to voltage application,
wherein the second pattern part comprises a light transmitting material,
wherein a width of the second pattern part is larger than a width of the first pattern part,
wherein the width of the first pattern part changes while extending from the upper substrate toward the lower substrate,
wherein a separation region is formed between the first pattern part and the lower electrode,
wherein the separation region is formed of a same material as the second pattern part,
wherein the light moves from the upper substrate toward the lower substrate,
wherein the width of the first pattern part is widened while extending from the upper substrate toward the lower substrate,
wherein the first pattern part includes a matrix and a plurality of beads dispersed in the matrix,
wherein when a voltage is applied to the first pattern part the plurality of beads move from inside of the first pattern part toward the upper substrate, and
wherein the lower substrate includes a visual field surface, and the upper substrate includes a surface facing the visual field surface.

2. The optical path control member of claim 1, wherein a first end of the first pattern part is disposed in contact with the upper electrode.

3. The optical path control member of claim 1, wherein the first pattern part includes a first-first pattern part adjacent to the lower electrode and a first-second pattern part adjacent to the upper electrode, and
a width and a height of the first-first pattern part are larger than those of the first-second pattern part.

4. The optical path control member of claim 1, wherein the first pattern part includes an upper surface adjacent to the upper electrode and a lower surface adjacent to the lower electrode, and
a width of the upper surface of the first pattern part is smaller than a width of the lower surface of the first pattern part.

5. The optical path control member of claim 4, wherein the second pattern part includes an upper surface adjacent to the upper electrode and a lower surface adjacent to the lower electrode, and
a width of the upper surface of the second pattern part is larger than the width of the lower surface of the first pattern part.

6. The optical path control member of claim 5, wherein the width of the upper surface of the second pattern part is larger than the width of the upper surface of the first pattern part.

7. The optical path control member of claim 5, wherein a width of the lower surface of the second pattern part is larger than the width of the lower surface of the first pattern part.

8. A display device comprising:
a display panel; and
an optical path control member disposed on the display panel,
wherein the optical path control member comprises:
a first substrate on the display panel;
a first electrode on the first substrate;
a second substrate under the first substrate;
a second electrode disposed under the second substrate; and
a pattern part disposed between the first electrode and the second electrode and through which light is transmitted,
wherein the pattern part includes a first pattern part and a second pattern part alternately disposed,
wherein light transmittance of the first pattern part is changed according to voltage application,
wherein the second pattern part includes a light transmitting material,
wherein a width of the second pattern part is larger than a width of the first pattern part,
wherein the width of the first pattern part changes while extending from the upper substrate toward the lower substrate, wherein a separation region is formed between the first pattern part and the first electrode, wherein the separation region is formed of a same material as the second pattern part, wherein the light moves from the upper substrate toward the lower substrate, wherein the width of the first pattern part is widened while extending from the upper substrate toward the lower substrate, wherein the first pattern part includes a matrix and a plurality of beads dispersed in the matrix, wherein when a voltage is applied to the first pattern part the plurality of beads move from inside of the first pattern part toward the upper substrate, and wherein the lower substrate includes a visual field surface, and the upper substrate includes a surface facing the visual field surface.

* * * * *